Patented Feb. 18, 1947

2,415,802

UNITED STATES PATENT OFFICE 2,415,802

ROTENOID COMPOSITIONS

Lowell B. Kilgore, Arlington, Va., assignor, by mesne assignments, to U. S. Industrial Chemicals, Inc., a corporation of Delaware No Drawing. Application March 11, 1942, Serial No. 434,296

23 Claims. (Cl. 167—24)

This invention pertains to improved insecticidal compositions that contain rotenone ingredients.

Rotenone is the active component of various insecticides. It is extracted from certain botanicals, but may be accompanied by other insecticidal compounds. These all may be designated as rotenoids, and such extracts termed rotenoid extractives. Rotenoid botanicals comprise the genera Derris, e. g. *Derris elliptica; Derris chinensis; Derris malaccensis; Derris polyantha; Derris uliginosa;* and comprise the genera Lonchocarpus, for example *Lonchocarpus nicou* (cube), (barbasco), (timbo) and the genera Tephrosia (cracea), for example *Cracca virginianna; Cracca cinerea.* It will be sufficient to illustrate this invention by referring to Derris extractives, though the invention is applicable to rotenoid extractives generally.

The insecticidal art has been impeded by the fact that Derris extractives are not soluble in water nor soluble in oil. The art seeks concentrated sprays of these botanicals in deodorized mineral oil or kerosene. The art also would use concentrated and stable aqueous sprays. The rotenoid botanicals have been applied largely in the form of dusts prepared by grinding the various plant parts to a fine powder. The rotenoid powder is extended with a filler to form a dusting type insecticide or is suspended in water to produce a liquid spray.

In the case of a powder or in the case of a suspension it is clear that the contact surface provided by the insecticidally active plant powder is almost negligible compared to the surface of the leaf on which it is placed. However, a solution of the extractive would spread over the leaf in a thin but continuous film and secure greatly improved contact with infesting insects. A further disadvantage of dust or of suspension of powder lies not only in the incomplete coverage but in mechanical loss, as for example in removal by wind or rain. The plant powder is not easily made to adhere to leaf surfaces.

A further objection to rotenoid insecticides heretofore has been their tendency to separate from a liquid carrier. This becomes apparent especially if the fluid is exposed to low temperatures for any appreciable period of time and is apparent particularly where the amount of suspended material is at all large. The preparation of a stable but concentrated rotenoid insecticide has been practically impossible because of the incompatibility of rotenoid bodies with water or with oils.

An object of this invention is to prepare solutions of Derris extractives or of rotenoid extractives broadly. A further purpose is to prepare a rotenoid solution that may be of considerable concentration and yet will be stable even at low temperature or over considerable range of temperature.

A further purpose is to prepare a rotenoid solution, particularly a concentrated solution, that is miscible either with water or with oil. An especially important purpose is to prepare a solution of Derris extractives that may readily be mixed with water to form an insecticidal composition of considerable concentration or of considerable potency.

A specific purpose is to obtain a solution of rotenoid extractive in such concentration and of such characteristics that it may be added to deodorized kerosene or the like in relatively small amounts, say less than five percent, and yet carry in solution substantial amounts of ingredients toxic to insects.

Important in these various purposes is preparation of these rotenoid concentrates and resulting compositions to be effective against insects, but not to injure plant life nor man nor other warm-blooded animals. Injurious effects of compositions that are effective against insects, but that injure plant life or higher animal life have prevented adoption of various experimental or proposed insecticides.

A further purpose of this invention is to obtain rotenoid extractives in solutions that are substantially odorless, or free from irritation of the nose and throat of higher animals.

This invention stems from the discovery that rotenoid bodies or Derris extractives are soluble in esters of p-isopropyl benzoic acid. This acid is sometimes known commercially as cumic acid or as cuminic acid. Such esters may be designated by the general formula:

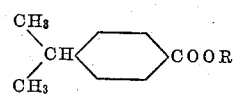

wherein the esterifying group R is an alkyl, aralkyl, aryl or heterocyclic group. This invention is particularly useful where the esterifying group is the propyl, the butyl or the amyl group. The butyl ester is preferred.

Specific illustrations will be given of this discovery and application to insecticidal purposes, but it is evident that the number of examples need not be multiplied by endeavoring to illustrate every esterifying group or composition that will accomplish the results of this invention.

EXAMPLE 1

A 24 percent solution of Derris extractives containing 35 percent rotenone was prepared by dissolving 12 grams of the extractives in 38 grams of butyl p-isopropyl benzoate. The dissolution was more rapidly effected by heating. This solution remained homogeneous even after several days storage under refrigeration at about 40° F.

EXAMPLE 2

100 grams of emulsifiable spray concentrate were prepared by admixing 50 grams of the solution described in Example 1 with an equal weight of sulfonated soy bean oil whereby a homogeneous composition was produced. This solution though likewise stored for several days under refrigeration at approximately 20° F., produced no separation nor precipitation.

EXAMPLE 3

A liter of horticultural insecticide spray was prepared by adding 10 ml. of the concentrate described in Example 2 to 990 ml. of water at room temperature. At once a stable emulsion was produced with simple stirring. This emulsion was suitable for spraying by means of conventional atomizing equipment of the industry. The emulsion showed a blue opalescence, indicating extremely finely divided condition. The stability thus indicated was verified by absence of any change during protracted storage.

EXAMPLE 4

Ground barbasco root was extracted with acetone and the acetone evaporated from the resulting solution to form a resin. A 30 percent solution of these extractives was made in butyl p-isopropyl benzoate by dissolving 5 grams of the extractives in 11.5 grams of the ester. This concentrate when diluted with one-half of its volume of sulfonated soy bean oil, produced a stable emulsion easily in water similar to Example 3. The concentration of the extractives in the sulfonated soy bean oil composition formed in the above manner is equivalent to approximately 20 percent by weight.

EXAMPLE 5

1 gram of Derris extractives was dissolved in 8 grams of dodecyl p-isopropyl benzoate at room temperature. 1 ml. of this concentrate was added to 99 ml. of deodorized kerosene and filtered. The clear filtrate thus obtained was shown by colorimetric determination to contain rotenone.

The following typical esters of p-isopropyl benzoic acid were prepared and used in the manner described in the foregoing examples as solvents and co-solvents for rotenone-type extractives;

*p-Isopropyl. benzoic ester—"R" in above general formula*

Methyl, —$CH_3$
Ethyl, —$C_2H_5$
Isopropyl, —i—$C_3H_7$
Sec. butyl, —S—$C_4H_9$
Butyl, —$C_4H_9$
Isobutyl, —i—$C_4H_9$
Tert. butyl, —t—$C_4H_9$
Dodecyl, —$C_{12}H_{25}$
Phenyl, —$C_6H_5$
Benzyl, —$C_6H_5CH_2$
Cyclohexyl, —$C_6H_{11}$
$\beta'$-Butoxy-$\beta$-ethoxyethyl, —$C_4H_9OC_2H_4OC_2H_4$
2,3,4,6-tetrachlorophenyl, —$Cl_4C_6H$

EXAMPLE 6

A petunia plant heavily infested with aphids, *aphis rumicis*, was segregated and sprayed with about 5 cc. of a 1:800 dilution of the spray concentrate described in Example 4 above. After 24 hours 95 percent of the insects were dead including moribund. After 48 hours all insects were dead.

Young soy bean plants about two weeks old, were sprayed with various concentrations of the concentrate shown in Example 4, ranging from 1:100 to 1:400. The concentrations of extractives in these sprays are equivalent to approximately 0.2 to 0.5 percent by weight. No injury was shown toward these plants. Such plants were also infested with red spider and mealy bugs. Spraying with the above emulsion from Example 4 gave excellent control of these insects.

Toxicological tests have shown that butyl ester of p-isopropyl benzoic acid is not toxic to man or other warm-blooded animals. Therefore use of these new rotenoid compositions is entirely safe even on fruit or vegetable plants.

This invention is not restricted to the use of sulfonated soy bean oil as the emulsifying agent. Hydrocarbon oils or fish oils also are solvents for the p-isopropyl benzoic acid esters, and their solutions act similarly. I have found that other agents or carriers, such as sulfonated castor oil, sulfated fatty alcohols, soaps and the like are useful for this purpose. Although not all such agents form a true solution with the p-isopropyl benzoic acid ester solution of the extractives, they will cause an emulsion suitable for spraying.

Though this invention has been applied to insecticidal compositions, it will be useful also for the various other purposes for which rotenoid compounds are known, for example in stunning or paralyzing various forms of fish life or in controlling various organisms.

One part of dry, powdered cube (*L. nicou*) was intimately mixed with five parts of n-butyl p-isopropyl benzoate and warmed on a water bath about an hour. This effected rapid extraction of the insecticidally active ingredients or rotenoid substances of the root. The mixture on filtering yielded a reddish brown filtrate which contained rotenone.

Two parts of the above extract was diluted with one part of "Areskap 50" (monosodium sulfonate of butylated orthophenylphenol) emulsifying agent to form a water emulsifiable insecticide concentrate. When this concentrate is added to water an emulsion is formed suitable for spraying on plants.

While I have in the above description disclosed what I believe to be a preferred and practical embodiment of the invention, it will be understood by those skilled in the art that the specific details of construction and arrangement of parts are subject to some latitude of variation without transcending the spirit and scope of the invention.

What I claim is:

1. As a new composition of matter an insect toxic proportion of botanical rotenoid extractive dissolved in an ester of p-isopropyl benzoic acid.

2. As a new composition of matter an insect toxic proportion of botanical rotenoid extractive dissolved in a butyl ester of p-isopropyl benzoic acid.

3. A new composition of matter comprising a solution of rotenoid extractives dissolved in an ester of p-isopropyl benzoic acid, distributed in sulfonated vegetable oil wherein said rotenoid extractives comprise 20 percent by weight of total composition.

4. A new composition of matter comprising a solution of an insect toxic proportion of botanical rotenoid extractive dissolved in an ester of p-isopropyl benzoic acid, distributed in sulfonated vegetable oil.

5. A new composition of matter comprising a solution of an insect toxic proportion of botanical rotenoid extractive dissolved in an ester of p-isopropyl benzoic acid, distributed in sulfonated soy bean oil.

6. A new composition of matter comprising a solution of an insect toxic proportion of botanical rotenoid extractive dissolved in an ester of p-isopropyl benzoic acid, distributed in kerosene oil.

7. A new composition of matter comprising an aqueous dispersion of a solution consisting of an insect toxic proportion of botanical rotenoid extractive dissolved in butyl ester of p-isopropyl benzoic acid, distributed in sulfonated vegetable oil.

8. A new composition of matter comprising an aqueous dispersion of a solution of rotenoid extractive dissolved in p-isopropyl benzoic acid ester, distributed in sulfonated vegetable oil, wherein said rotenoid extractives comprise about 0.05 to 0.2 percent by weight of total composition.

9. A process of obtaining rotenoid extractives from botanicals comprising extracting the botanicals with ester of p-isopropyl benzoic acid.

10. A process of obtaining rotenoid extractives from botanicals comprising extracting the botanicals with butyl ester of p-isopropyl benzoic acid.

11. As a new composition of matter an insect toxic proportion of botanical rotenoid extractive dissolved in dodecyl ester of p-isopropyl benzoic acid.

12. A new composition of matter comprising a solution of an insect toxic proportion of botanical rotenoid extractive dissolved in an ester of p-isopropyl benzoic acid, distributed in a sulfonated fatty alcohol.

13. A new composition of matter comprising a solution of an insect toxic proportion of botanical rotenoid extractive dissolved in an ester of p-isopropyl benzoic acid, distributed in a hydrocarbon oil.

14. A new composition of matter comprising a solution of an insect toxic proportion of botanical rotenoid extractive dissolved in butyl ester of p-isopropyl benzoic acid, distributed in sulfonated vegetable oil.

15. A new composition of matter comprising a solution of an insect toxic proportion of botanical rotenoid extractive dissolved in dodecyl ester of p-isopropyl benzoic acid, distributed in sulfonated vegetable oil.

16. A new composition of matter comprising an aqueous dispersion of a solution consisting of an insect toxic proportion of a botanical rotenoid extractive dissolved in an ester of p-isopropyl benzoic acid, distributed in a sulfonated fatty alcohol.

17. A new composition of matter comprising an aqueous dispersion of a solution consisting of an insect toxic proportion of a botanical rotenoid extractive dissolved in an ester of p-isopropyl benzoic acid, distributed in sulfonated vegetable oil.

18. A new composition of matter comprising an aqueous dispersion of a solution consisting of an insect toxic proportion of a botanical rotenoid extractive dissolved in butyl ester of p-isopropyl benzoic acid, distributed in sulfonated soy bean oil.

19. A new composition of matter comprising an aqueous dispersion of a solution consisting of an insect toxic proportion of a botanical rotenoid extractive dissolved in dodecyl ester of p-isopropyl benzoic acid, distributed in sulfonated vegetable oil.

20. A new composition of matter comprising an aqueous dispersion of a solution consisting of an insect toxic proportion of a botanical rotenoid extractive dissolved in dodecyl ester of p-isopropyl benzoic acid, distributed in sulfonated soy bean oil.

21. A process of obtaining rotenoid extractives from botanicals comprising extracting the botanicals with dodecyl ester of p-isopropyl benzoic acid.

22. A new composition of matter comprising a solution of an insect toxic proportion of botanical rotenoid extractive dissolved in an ester of p-isopropyl benzoic acid, distributed in an organic carrier.

23. A new composition of matter comprising an aqueous dispersion of a solution consisting of an insect toxic proportion of a botanical rotenoid extractive dissolved in an ester of p-isopropyl benzoic acid, distributed in an organic carrier.

LOWELL B. KILGORE.

REFERENCES CITED

The following references are of record in the file of this patent:

UNITED STATES PATENTS

| Number | Name | Date |
| --- | --- | --- |
| 2,000,004 | Adams | May 7, 1935 |
| 1,967,024 | Fulton | July 17, 1934 |
| 2,158,724 | Kilgore | May 16, 1929 |
| 2,205,394 | Coleman et al. | June 25, 1940 |
| 2,252,548 | Borglin | Aug. 12, 1941 |
| 2,279,800 | ter Horst | Apr. 14, 1942 |

FOREIGN PATENTS

| Number | Country | Date |
| --- | --- | --- |
| 434,660 | British | Sept. 6, 1935 |